US012576798B2

(12) United States Patent
Smits

(10) Patent No.: US 12,576,798 B2
(45) Date of Patent: Mar. 17, 2026

(54) CAMERA SYSTEM AND ASSISTANCE SYSTEM FOR A VEHICLE AND A METHOD FOR OPERATING A CAMERA SYSTEM

(71) Applicant: Continental Automotive GmbH, Hannover (DE)

(72) Inventor: Thomas Smits, Straelen (DE)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 542 days.

(21) Appl. No.: 17/302,302

(22) Filed: Apr. 29, 2021

(65) Prior Publication Data

US 2021/0245678 A1 Aug. 12, 2021

Related U.S. Application Data

(63) Continuation of application No. PCT/EP2019/075928, filed on Sep. 25, 2019.

(30) Foreign Application Priority Data

Oct. 31, 2018 (DE) ..................... 10 2018 218 735.5

(51) Int. Cl.
| | |
|---|---|
| *B60R 11/04* | (2006.01) |
| *H04N 7/18* | (2006.01) |
| *B60R 11/00* | (2006.01) |

(52) U.S. Cl.
CPC ............. *B60R 11/04* (2013.01); *H04N 7/183* (2013.01); *B60R 2011/0052* (2013.01); *B60R 2011/007* (2013.01); *B60R 2300/8046* (2013.01)

(58) Field of Classification Search
CPC ..... B60R 11/04; B60R 1/00; B60R 2011/007; B60R 2300/8046; H04N 7/183; H04N 23/57

(Continued)

(56) References Cited

U.S. PATENT DOCUMENTS

| | | | | |
|---|---|---|---|---|
| 10,703,297 B1 * | 7/2020 | Cohen | ..................... | B60N 3/103 |
| 2006/0098094 A1 * | 5/2006 | Lott | ........................... | B60R 1/00 |
| | | | | 348/148 |

(Continued)

FOREIGN PATENT DOCUMENTS

| | | | |
|---|---|---|---|
| DE | 202004008423 U1 | 10/2005 | |
| DE | 102005050363 A1 | 4/2007 | |

(Continued)

OTHER PUBLICATIONS

Office Action dated Apr. 5, 2023 from corresponding Canadian patent application No. 3113008.

(Continued)

*Primary Examiner* — Loi H Tran
(74) *Attorney, Agent, or Firm* — COZEN O'CONNOR

(57) ABSTRACT

A camera system for a vehicle comprises a holding device that can be fastened to the vehicle and that comprises a first communication interface for wireless communication. A camera that comprises an accumulator and a second communication interface for wireless communication. The camera is removably fastened to the holding device, and the second communication interface is designed to receive position data from the first communication interface by means of wireless near-field communication in order to determine a position of the holding device relative to the vehicle when the camera is fastened to the holding device.

11 Claims, 5 Drawing Sheets

(58) Field of Classification Search
USPC ........................................................ 348/148
See application file for complete search history.

(56) References Cited

U.S. PATENT DOCUMENTS

| | | | | |
|---|---|---|---|---|
| 2007/0110511 | A1* | 5/2007 | Chen ...................... | A47B 57/40 |
| | | | | 403/230 |
| 2007/0201860 | A1* | 8/2007 | Schmid ..................... | B60R 1/00 |
| | | | | 396/419 |
| 2008/0098514 | A1* | 5/2008 | Kelley ................. | E03D 13/005 |
| | | | | 4/661 |
| 2013/0235204 | A1* | 9/2013 | Buschmann ............. | H04N 7/18 |
| | | | | 348/148 |
| 2014/0327770 | A1* | 11/2014 | Wagreich ............... | H04N 7/183 |
| | | | | 348/148 |
| 2015/0277503 | A1* | 10/2015 | Eremenko ............. | H04W 88/02 |
| | | | | 361/679.4 |

| | | | | |
|---|---|---|---|---|
| 2017/0158133 | A1* | 6/2017 | Chundrlik, Jr. ........... | B60R 1/29 |
| 2018/0352160 | A1* | 12/2018 | Lu .............................. | E06B 9/24 |
| 2019/0184980 | A1* | 6/2019 | Goumy ................. | H01Q 1/3233 |
| 2019/0359132 | A1* | 11/2019 | Zinner ................. | H04N 23/698 |

FOREIGN PATENT DOCUMENTS

| | | |
|---|---|---|
| DE | 102010003888 A1 | 10/2011 |
| DE | 102013021818 A1 | 6/2015 |
| DE | 112015005633 T5 | 9/2017 |
| EP | 1777106 A2 | 4/2007 |
| EP | 2270994 A2 | 1/2011 |
| WO | 2017153307 A1 | 9/2017 |

OTHER PUBLICATIONS

Office Action dated Jan. 15, 2024 from corresponding Canadian patent application No. 3,113,008.

* cited by examiner

CAMERA SYSTEM AND ASSISTANCE SYSTEM FOR A VEHICLE AND A METHOD FOR OPERATING A CAMERA SYSTEM

CROSS REFERENCE TO RELATED APPLICATIONS

This application claims the benefit of PCT Application PCT/EP2019/075928, filed Sep. 25, 2019, which claims priority to German Application DE 10 2018 218 735.5, filed Oct. 31, 2018. The disclosures of the above applications are incorporated herein by reference.

TECHNICAL FIELD

A camera system for a vehicle is disclosed, in particular a camera system for an assistance system of the vehicle. An assistance system for a vehicle that comprises a camera system is furthermore disclosed. A method for operating a camera system for a vehicle is also disclosed.

BACKGROUND

Vehicles can comprise a camera and a monitor that displays pictures from the camera to a user of the vehicle. Mirror replacement systems in which the fields of view of conventional exterior mirrors are represented by means of the camera and of the monitor are, for example, known. Reversing cameras by means of which regions that cannot be seen with conventional mirrors can be represented are also known.

It is desirable to provide a camera system for a vehicle and/or vehicle assistance system that can be used flexibly and reliably.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to at least one embodiment, a camera system for a vehicle comprises a holding device. The holding device can be fastened to the vehicle, in particular to an exterior of the vehicle. The holding device comprises a first communication interface for wireless communication. The camera system comprises a camera. The camera comprises an accumulator. The camera comprises a second communication interface for wireless communication. The camera can be fastened removably to the holding device. The second communication interface is designed, when the camera is in a fastened state, to receive position data from the first communication interface by means of wireless near-field communication, in order to determine a position of the holding device relative to the vehicle.

The vehicle is, for example, a motor vehicle such as a private car, a truck or a construction site vehicle such as an excavator. The vehicle is, for example, a trailer for a motor vehicle.

The holding device can be fastened to the vehicle, for example by means of screws or other fastening means. In one embodiment, the holding device can, for example, be fastened in such a way that it cannot simply be removed again from the vehicle non-destructively.

The holding device is designed to accommodate and hold the camera. The camera can thus be fastened to the vehicle by means of the holding device. The camera can be fastened to the holding device by means of magnets, for example. The camera can be removed again from the holding device non-destructively. It is thus, for example, possible to use the camera at a plurality of vehicles, each of which has its own holding device. It is furthermore, for example, possible to insert the camera into the holding device only at times during which the vehicle is operating, and otherwise to remove it from the holding device when the vehicle is, for example, parked.

It is possible to transmit position data from the holding device to the camera by means of the two communication interfaces. The position data may be transmitted by means of radio technology. Position data may be transmitted by means of near-field communication (NFC), so that the position data is, for example, only transmitted when the camera is in the fastened state. The position data is, for example, transmitted by means of RFID, NFC, Bluetooth or other radio near-field communication standard. Data can be transmitted from the holding device by, for example, a bus system, to further control devices, for example by means of CAN.

The position data is, for example, stored in a memory of the holding device. The position data is, for example, transmitted when the holding device is first mounted at the vehicle, and stored in the memory. Alternatively or in addition, the position data is stored externally in a database and, for example, called up by way of a service supplier. A representative identifier is, for example, stored in the holding device as a position datum. The camera is designed to receive this representative identifier and, depending on the representative identifier, to call up the position of the holder relative to the vehicle from the external database. According to some embodiments, information about the relative positioning is stored on the camera, for example in a database. Information about multiple vehicles is, for example, stored in the database. The position that corresponds to the vehicle at which the camera is employed can be called up from the database depending on the representative identifier.

The camera is designed to transmit its video signal, together with the position data, for further processing to an assistance system of the vehicle, for example by way of a radio connection. A display of the video signal of the camera is thus possible depending on the precise position of the camera relative to the vehicle. In this way it is, for example, possible to simplify software-based image processing and to design it more robustly. Resource-saving image processing is, for example, thereby possible. In addition it is possible to combine the image of the camera with images of further cameras and, for example, to display them together. The further cameras are, for example, permanently installed cameras of the vehicle. Joining the images of the different cameras together is possible depending on the accurate knowledge of the position of the camera. The exchange of the position data by means of the wireless near-field communication thus enables integration of the mobile camera into the assistance system of the vehicle.

According to one embodiment, the camera can be fastened to the holding device by a switchable magnet. The switchable magnet, for example comprises an electromagnet, and is magnetic when not energized. Following application of an electrical voltage, the magnetic field of a permanent magnet of the switchable magnet is, for example, at least partially cancelled, whereby the magnetic force of the switchable magnet is reduced or cancelled. A reliable fastening of the camera to the holding device is thus possible. Theft protection can thus, for example, be realized. According to further forms of embodiment, the switchable magnet comprises an electromagnetic that is magnetic when energized.

According to one embodiment, the holding device comprises a memory in which information that is representative of the position of the holding device can be stored. The position is, for example, measured when the holding device is assembled, and is stored in the memory in relation to the vehicle coordinate system. Alternatively or in addition, the type of the vehicle, for example the type of the trailer, is, for example, known. A position for the assembly of the holding device is specified depending on the type of the vehicle. The position of the holding device relative to the vehicle coordinate system is thus known, depending on the type of the vehicle.

Alternatively or in addition the position and/or the type of the vehicle is stored non-centrally in a database, and is queried by means of the representative identifier.

According to one embodiment, the holding device comprises an energy transmission device. The energy transmission device can be coupled electrically to an electrical grid of the vehicle. The energy transmission device comprises, for example, a coil. According to one form of embodiment, the camera comprises an energy receiving device. The energy receiving device is electrically connected to the accumulator. The energy receiving device comprises, for example, a coil. Electrical energy can be transmitted wirelessly from the energy transmission device to the energy receiving device for charging the accumulator inductively. It is thus possible according to this exemplary embodiment, to supply the camera with electrical energy when operating while fastened in the holding device. No wiring needs to be provided between the holding device and the camera for this purpose. The camera and the holding device are designed to exchange both information and energy with one another wirelessly.

According to some embodiments, the holding device comprises a side panel that encloses the camera laterally when in the fastened state. The side panel has a height. The height is such that a top side of the side panel is flush with a top side of the camera when fastened. When fastened, the camera is thus entirely laterally surrounded by the holding device. This contributes to improved theft protection. The camera for example has a round outer perimeter. The side panel of the holding device surrounds the camera concentrically. Because the top sides are flush with one another, there are no engagement surfaces sufficient for removing the camera from the holding device non-destructively. The camera is, for example, held in the holding device by means of the switchable magnet. Due to the height of the side panel, sufficient forces cannot be brought to bear on the camera non-destructively to unwantedly remove the camera from the holding device. An authorized user of the vehicle can, for example, switch the switchable magnet in order to reduce the holding forces of the magnet and thus to be able to remove the camera from the holding device. The camera is, for example, held in the holding device until the user actually touches the camera in order to prevent the camera from falling out of the holding device.

The holding device comprises, for example, a spring mechanism in order to apply a compression force to the camera. This simplifies the intentional removal of the camera from the holding device. The spring mechanism in addition, for example, attenuates the magnetic forces when inserting the camera into the holding device, so that a gentler insertion is enabled.

According to one embodiment, the holding device comprises a signal amplifier. The signal amplifier is designed to extend the range of a radio signal of the camera. The camera is, for example, designed to transmit its video signal to a receiving device of the vehicle by means of a WLAN standard or another radio connection. The radio video signal of the camera can be amplified by means of the signal amplifier of the holding device, and the range can thus be improved. For example when the holding device is mounted at the rear of a metal trailer, a sufficiently stable transmission of the radio video signal is nevertheless possible.

According to one embodiment, an assistance system for a vehicle comprises a camera system in accordance with at least one form of embodiment. The assistance system comprises at least one further camera. The assistance system comprises a monitor. Images of the camera and of the further camera can be displayed in combined form on the monitor. The position of the camera relative to the vehicle is known as a result of the transmission of the position data from the holding device to the camera. This simplifies a reliable display of the image of the camera in combination with the image of the further camera. The position of the camera of the camera system and the position of the further camera relative to one another are known.

According to one form of embodiment, the assistance system is part of a mirror replacement system for the vehicle. The mirror replacement system serves to replace conventional side mirrors of the motor vehicle. Alternatively or in addition, the assistance system is a reversing assistance system that is designed to represent regions behind the vehicle on the monitor.

According to one form of embodiment, a method serves to operate a camera system according to at least one described form of embodiment. The method involves recording an image by means of the camera. The image is transmitted by means of a radio connection to an assistance system of the vehicle. The position data are transmitted to the assistance system. The image of the camera is displayed depending on the position data. A reliable display of the image is thus possible in which the time for software processing is reduced.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE FIGURES

The present disclosure will become more fully understood from the detailed description and the accompanying figures. Identical elements or elements of the same type or with equivalent actions may be denoted therein by the same reference signs. Here.

DETAILED DESCRIPTION

Figure 1:
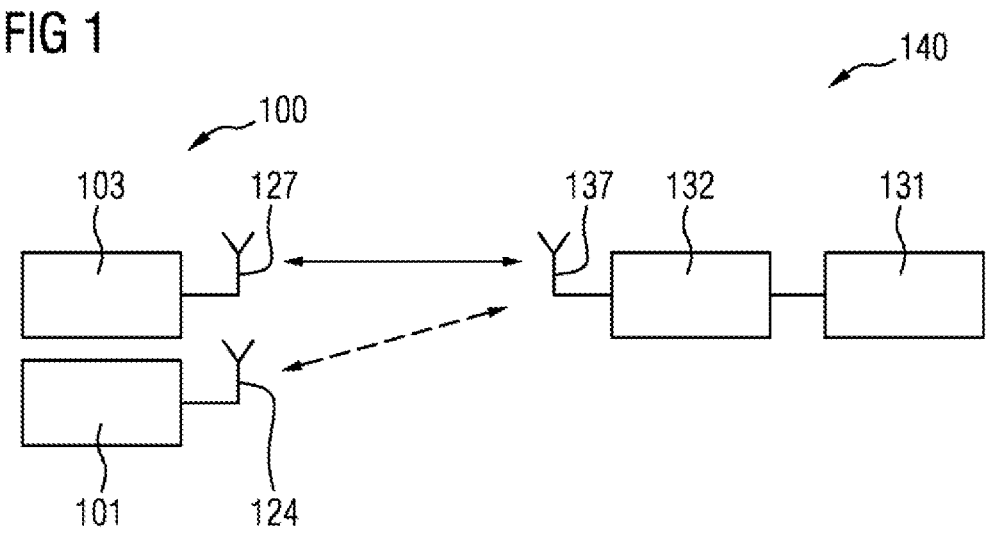
FIG. 1 shows a schematic illustration of an assistance system according to one exemplary embodiment.

FIG. 1 shows a schematic illustration of an assistance system 140 for a vehicle. The assistance system 140 is, for example, part of a mirror replacement system and/or part of a reversing assistance system for a user of the vehicle.

The assistance system 140 comprises a camera system 100. The camera system 100 comprises a camera 103. The camera system 100 comprises a holding device 101. The holding device 101 is fastened to the vehicle. The camera 103 can be fastened reversibly to the holding device 101. The camera system, for example, has an unfastened state in which the camera 103 is not arranged at the holding device 101. In a fastened state, the camera 103 is held by the holding device 101 and may be in particular not movable, or only insignificantly movable, relative to the holding device 101.

The assistance system 140 comprises a receiving device 132 and a monitor 131. Further elements such as control devices and image processing devices can be provided. The monitor 131 is for example arranged in the interior of the vehicle and, for example, within the field of view of a user of the vehicle. The monitor 131 serves to display images or videos from the camera 103.

The image signals of the camera 103 are transmitted in operation wirelessly by means of radio technology between the camera system 100 and the receiving unit 132. The camera 103 comprises an antenna 127 for this purpose. The receiving device 132 correspondingly comprises an antenna 137. The holding device 101 optionally also comprises an antenna 124. The antenna 124 is, for example, part of a signal amplifier 115 (FIG. 4), which is provided according to exemplary embodiments in the holding device 101.

The camera 103 is a radio camera for extending the field-of-view in the vehicle. The camera 103 can be used in a mobile and flexible manner, and can, for example, be coupled to a plurality of different holding devices 101 at different vehicles. The camera 103 does not in itself have to be directly connected to the vehicle and does not, for example, have to be screwed to the vehicle. The camera 103 is fastened reversibly to the vehicle by means of the holding device 101. A temporary attachment of the camera 103 to the vehicle is thus enabled by means of the holding device 101. It is thus possible also to use the camera 103 when permanent installations are not wanted. If, for example, the vehicle is a truck with a truck trailer, the trailers are frequently swapped, and, for example, third-party or rental trailers are used. Instead of always having to install permanently a new and separate system, the camera 103 can be employed in a user-friendly manner, and can be fastened quickly to various vehicles and removed again.

Figure 2:
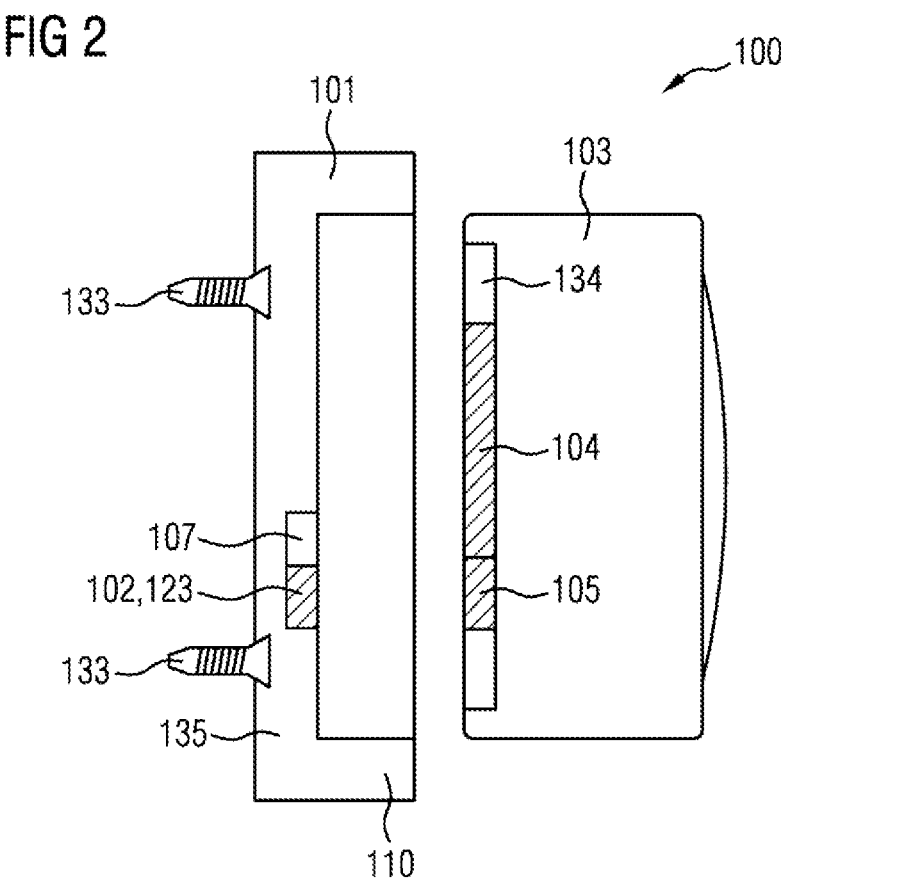
FIG. 2 shows a schematic illustration of a camera system according to one exemplary embodiment.

FIG. 2 shows the camera system 100 according to one exemplary embodiment.

The holding device 101 comprises a housing body 135. The housing body can, for example, be manufactured economically and efficiently from plastic. A large number of holding devices 101 can thus be manufactured and employed without great expense.

The holding device 101 can be mounted permanently on the vehicle by means of fastening elements 133. The fastening element 133 are, for example, screws. The fastening elements 133 may be arranged such that they are not accessible when the camera 103 is in the fastened state in the holding device 101.

The holding device 101 comprises a first communication interface 102. The first communication interface 102, for example, comprises an RFID transponder 123.

The camera 103 comprises an accumulator 104. The accumulator 104 serves to provide the necessary electrical energy for the camera when in operation. The accumulator 104 can, for example, be charged inductively by means of an additional, external charging cradle, not illustrated, for example in the cab of the vehicle.

The camera 103 comprises a permanent magnet 134. The camera 103 can, for example, be fastened magnetically in the holding device 101 by means of the permanent magnet 134. According to some exemplary embodiments, the holding device comprises a corresponding magnet, not illustrated explicitly, for this purpose. The camera 103 can thus easily and reliably be fastened reversibly to the holding device 101.

The camera 103 comprises a second communication interface 105. The second communication interface 105, for example, comprises an RFID reading device.

It is possible for the camera 103 to read position data from the RFID transponder 123 by means of the second communication interface 105. The position data are, for example, stored in a memory 107 of the holding device 101. The memory 107 is, in particular, a semiconductor memory. Wireless radio transmission is possible between the first communication interface 102 and the second communication interface 105. This radio connection for the exchange of information stored in the holding device 101 is also possible by means of other standards, for example by means of Bluetooth, NFC or another near-field communication standard.

Position data is, for example, stored in the RFID transponder 123 that contains information about where, relative to the vehicle, the holding device 101 is mounted on the vehicle. The position data is, for example, known because the holder 101 is attached permanently at a defined location on the vehicle. Alternatively or in addition the holder 101 is mounted at an arbitrary position, and a calibration is carried out when first used.

If the camera 103 is coupled to the holder 101, for example to the RFID transponder 123, the stored position data is transmitted to the camera 103 and is, for example, stored there in a non-volatile memory. The camera can thus also transmit its position relative to the vehicle to the receiving device 132 by radio, together with its video signal.

The camera 103 can be placed and fastened by magnet in the holding device 101, and can also be removed again. By means of the RFID transponder 123 the respective holding device 101 is recognizable and distinguishable for the camera 103 and thereby for the respective vehicle. The data of the respective vehicle and the exact position of the camera 103 in relation to the vehicle, are, for example, thus available to the camera 103.

The position data is, for example, used in the assistance system 140 in order, in combination with further elements such as a mirror replacement system, to enable a simplified, robust combination of images from different cameras, for example by means of stitching. The functionality of integrating the camera 103 into the assistance system 140 with further cameras can be carried out more easily, more quickly and more accurately, since the exact position of the camera 103 relative to the vehicle, and thereby to the other cameras, is known. The image processing can thereby be carried out in a more precisely targeted and thereby more efficient manner.

For example, with a plurality of trailers, one or a plurality of holding devices 101 is mounted at a rear side of each. Depending on which trailer is used, the camera 103 is connected to the corresponding holding device 101.

For example, a private user who has a plurality of trailers, for example a horsebox, a trailer for a boat and/or a normal utility trailer, can also fit a holding device 101 to each trailer, and then connect the camera 103 to the respective desired trailer. In the case of agricultural applications too, the connection of the holding device 101 to different attachments, utility trailers or the like for a tractor is possible. It is also, for example, only necessary to connect one single camera 103 to the respectively desired vehicle.

In the case of a construction site vehicle such as, for example, an excavator or an earth mover, it is, for example, possible to attach the holding device 101 to an excavator arm. Data can then, for example, be exchanged about the excavator arm position or the like by means of the first communication interface 102 and the second communication interface 105. The camera 103, or the image of the camera 103, can thus be integrated into the coordinate system of the excavator in order to realize an adaptive control of the field-of-view and/or the automatic combination of multiple video signals.

Figure 3:
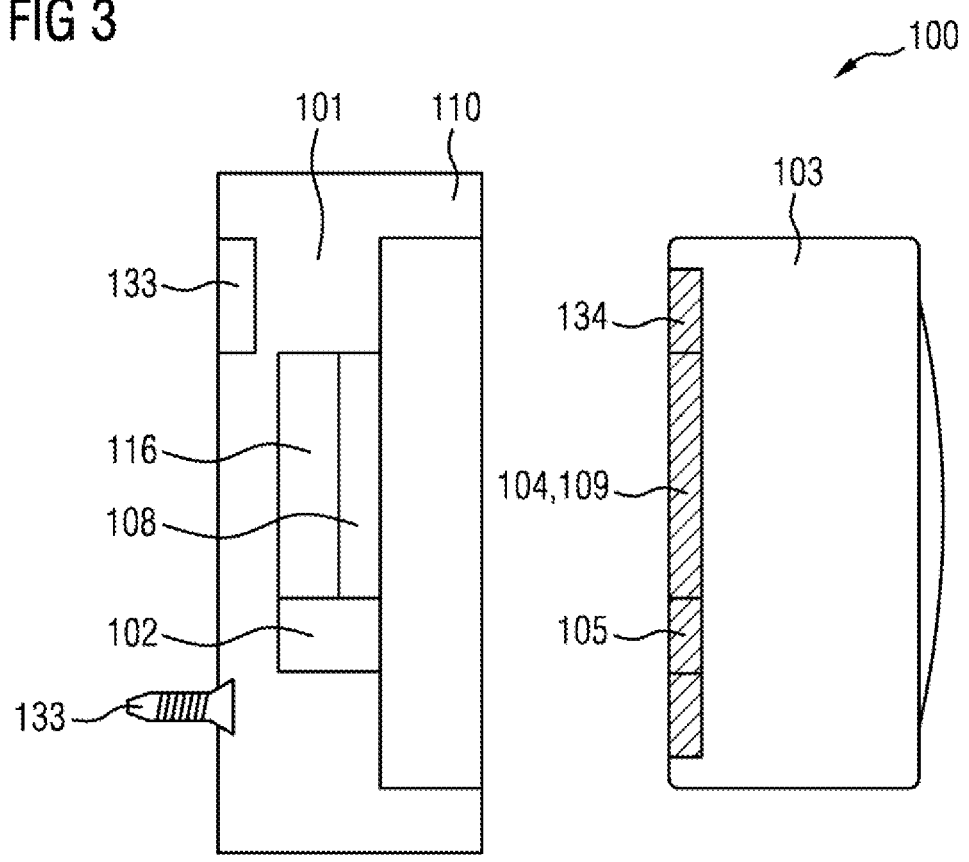
FIG. 3 shows a schematic illustration of a camera system according to one exemplary embodiment.

FIG. 3 shows the camera system 100 according to a further exemplary embodiment. The exemplary embodiment of FIG. 3 is based on the exemplary embodiment of FIG. 2. Differences and additional features will therefore be given in the following discussion.

The holding device 101 according to the exemplary embodiment of FIG. 3 comprises an energy transmission device 108. This is connected to a control module 116. The energy transmission device 108 is designed for charging the camera 103 inductively. The energy transmission device 108 comprises, for example, one or a plurality of coils.

The holding device 101 can be connected electrically to an electrical grid of the vehicle. Energy from the electrical grid of the vehicle can be transmitted without contact to the camera 103 by means of the energy transmission device 108. The control module 116 serves, for example, to control and regulate the charging of the accumulator 104 of the camera 103.

The camera 103 comprises an energy receiving device 109. The energy receiving device 109 comprises, for example, one or a plurality of coils. The energy receiving device 109 is designed to receive energy inductively. The energy receiving device 109 is electrically connected to the accumulator 104.

In comparison with the holding device 101 according to the exemplary embodiment of FIG. 2, the holding device 101 according to the exemplary embodiment of FIG. 3 thus has the facility of charging the camera 103 inductively. It is thus possible also to operate the camera 103 for a longer period of time in the holding device 101, for example longer than the time for which the energy stored in the accumulator 104 would be sufficient.

The control module 116 realizes the voltage supply with, for example, 12 V or 24 V, and the charging circuit and charge retention circuit. It is possible to charge the camera 103 wirelessly via the charging coil of the energy supply device 108. A plug-in connection to the holding device 101 may not be necessary for charging the camera 103. It is thus furthermore possible for the camera to be designed sufficiently waterproof and completely encapsulated. The camera 103, for example, satisfies the IP69 or IP69K standard, and is accordingly protected against water even when used for high-pressure cleaning and steam cleaning, as well as for use in both agricultural vehicles and road vehicles.

The camera 103 can, for example, be charged in the external charging cradle in the interior of the vehicle, which is, for example, connected to a 12 V socket or 24 V socket, for example to a cigarette lighter. The camera 103 is, additionally, chargeable in the holding device 101. The holding device 101 can, for example, also be used as a charging cradle for the interior.

The control module 116 is designed with further inputs and interfaces in some exemplary embodiments. The control module 116 can, for example, be coupled to a bus system of the vehicle, for example for reversing light detection. Information relating to the holding device 101 can also be called up by means of the control module 116, for example to control lighting.

The holding device 101, which is electrically connected to an external power supply, is designed in some exemplary embodiments to communicate with the second communication interface 105 of the camera 103 by means of the first communication interface 102 via Bluetooth, IEEE 802.11, UWB (ultra-wideband) and/or wireless USB or other radio standards. This, for example, takes place alternatively or in addition to the RFID or NFC communication.

Figure 4:
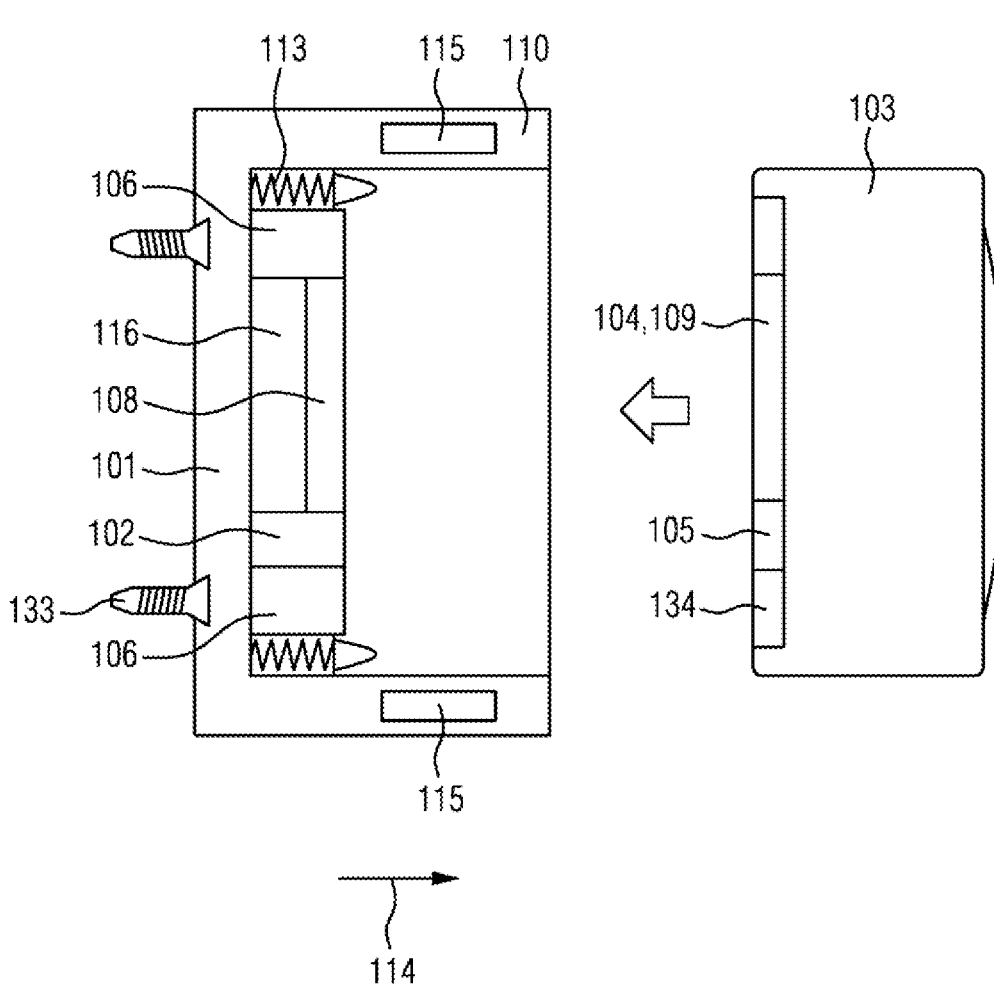
FIG. 4 shows a schematic illustration of a camera system according to one exemplary embodiment.

FIG. 4 shows the camera system 100 according to a further exemplary embodiment. The camera system 100 according to the exemplary embodiment of FIG. 4 is essentially based on the exemplary embodiment of FIG. 3. Differences and additional features will therefore be given in the following discussion.

The holding device 101 comprises a switchable magnet 106. The switchable magnet serves for coupling the permanent 134 of the camera 103 for fastening the camera 103 in the holding device 101. The switchable magnet comprises, for example, a permanent and an electromagnet. The switchable magnet 106 may be thus magnetic when not energized. As a result, secure fastening of the camera 103 in the holding device 101 is also ensured when no voltage is present, for example when the vehicle is parked. On the application of a voltage to the switchable magnet 106, the magnetic force of the permanent magnet is reduced to such an extent that the resultant magnetic force can easily be overcome. Switchable magnets 106 of this sort are available, for example, from Intertec®. A single switchable magnet 106 is, for example, designed to create a holding force of about 40 newtons. Four such magnets 106 are, for example, used. If losses are not allowed for, a holding force of altogether 34 kilograms can be realized together with the permanent magnets 134. With a current of around 500 mA for each magnet 106, the magnets can be briefly energized, and the camera 103 can be removed from the holding device 101. The number of magnets 106 depends in particular on a desired holding force. One skilled in the art would be able to determine the preferred number of magnets 106, and the individual and overall magnetic force of the magnets 106 for a particular holding device 101 and camera 134 arrangement.

The holding device 101 comprises a spring mechanism 113. The spring mechanism 113 is designed to apply a compressive force 114. The compressive force 114 is for example directed opposite to the magnetic force of the magnets 106. The spring mechanism 113 thus simplifies the removal of the camera from the holding device 101 when the magnets 106 are energized. The camera 103 is then already slightly pushed out of the holding device 101 by the spring mechanism 113. An engagement surface at the camera 103 is thereby exposed.

When inserting the camera 103 into the holding device 101, the spring mechanism 113 avoids an excessively sharp impact of the camera 103 against the holding device 101. Movement of the camera 103 in the direction of the magnet 106 is attenuated.

One skilled in the art would be able to determine the preferred spring rate of the spring mechanism 113 for a particular holding device 101 and camera 103 combination.

Alternatively it is also possible to reverse the direction of the resultant magnetic field of the switchable magnet 106, in order to release the camera 103 from the holding device 101. An attenuation when inserting could also be realized, for example by means of an approach sensor. By means, for example, of a capacitive resonant circuit, the approach of the camera 103 into the holder is recognized, and the magnet 106 appropriately energized in order to attenuate the movement of the camera 103.

Figure 5:
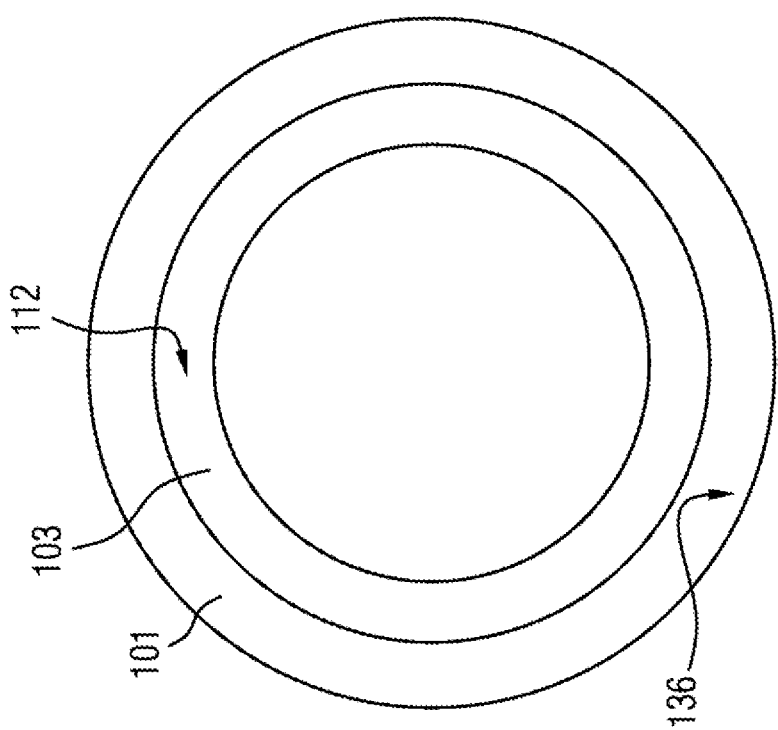
FIG. 5 shows a schematic illustration of the camera system according to FIG. 4 in the fastened state.
Figure 5:
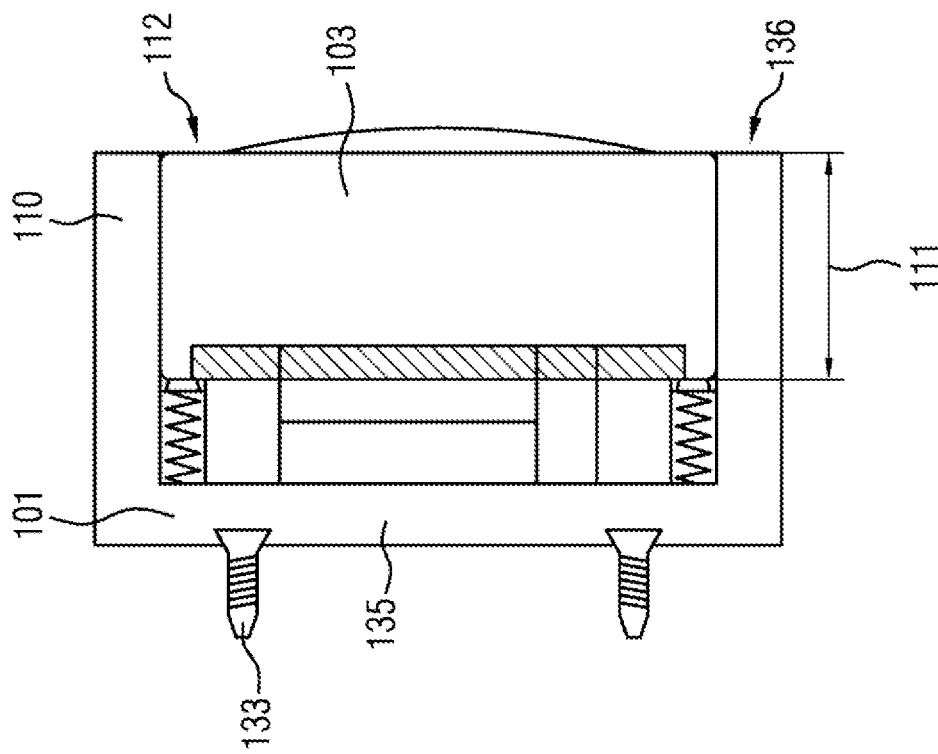

The housing body 135 of the holding device 101 comprises a side panel 110. The side panel 110 surrounds the camera 103 laterally when in the fastened state, as can also in particular be seen in FIG. 5. The side panel 110 has a height 111. The height 111 is selected such that a top side 136 of the side panel 110 that faces away from the vehicle when operating is flush with a top side 112 of the camera 103. As a result, and due for example to the outer contour of the camera 103 having a round design, when the camera 103 is in the fastened state, adequate engagement surfaces with which the camera 103 could be removed against the wishes of the user from the holding device 101 are not available. Theft protection is thus increased. The camera 103 can thus also remain in the holding device 101 during pauses. The holding force of the switchable magnets 106, in combination with the adequately high side panel 110 of the round exterior form, ensure that the camera 103 cannot be removed from the holding device 101 non-destructively unless the magnet 106 is energized. The camera 103, which can be simply and easily fastened by means of magnetic force, is thus protected against theft. The camera 103 can thus, for example, be inserted into the holding device 101 before travel begins. During a short stop, or also over a number of days or permanently, the camera 103 is held in the holder 101 without too much risk that the camera 103 can easily be removed by an unauthorized party.

The side panel 110 is designed in the form of a hollow cylinder. The height 111 is, fir example, greater than it is in the exemplary embodiments according to FIGS. 2 and 3. The height 111 is precisely such that the top side 112 of the camera 103 when in the fastened state lies flush against the top side 136 of the side panel 110. A mechanical engagement point with which the camera 103 could be seized by hand or with a tool, is thus avoided.

The round shape of the camera may also be useful for theft protection. With the most accurate possible fit of the holding device 101 and the camera 103, a flat tool such as, for example, a metal sheet, a screwdriver or the like cannot be used to lift the camera 103 out of the holding device 101 non-destructively. It is also possible for this purpose to give the side panel 110 a slightly conical form.

The camera can, for example, be released from the holder for a user input at the receiving device 132. Secure authentication thus protects against misuse. By means of the communication interfaces 102, 105, and in particular by means of the RFID transponder 123, further release methods can be implemented.

The camera 103 can thus also be held securely in the holding device 101 when not energized. The camera 103 can nevertheless be removed from the holding device 101 conveniently and quickly. The camera 103 can thereby be used flexibly, for example as a stand-alone camera 103 and in alternation with other holding devices 101. The camera 103 does not need any plug-in connectors for this. The housing 103 can remain closed, in order to achieve the adequate sealing of the camera 103 against, for example, water.

According to further exemplary embodiments, the camera 103 has a different external contour. An elongated form, a rectangular form or an oval form is, for example, also possible. This is, for example, for stereoscopic cameras and/or projection optics for structured light when a greater distance is necessary between the optical components. It is however assumed that the theft protection is at its most efficient with the round form.

The holding device 101 comprises the signal amplifier 115. The signal amplifier 115 receives electromagnetic waves from the camera 103. The electromagnetic waves of the camera serve, for example, to transmit the video signal of the camera 103 to the receiving device 132. The received electromagnetic waves are amplified by the signal amplifier 115 and then transmitted in amplified form to the receiving device 132. The signal amplifier 115 comprises, for example, for this purpose the antenna or a plurality of antennas 124. It is thus possible also to use the holding device 101 and the camera 103 under otherwise difficult propagation conditions for the radio signals of the camera 103. When the holding device 101 is, for example, used at the rear of a semi-trailer with a trailer made of metal, it is thus possible to bring the antenna 125 out and to position it in such a way that a radio connection to the receiving device 132, which is arranged in the towing vehicle, is possible. An amplification of the radio signals of the camera 103 is in this way possible, and it continues to be possible to avoid plug-in connections to the camera. The communication between the camera 103 and the holding device 101 takes place wirelessly.

Figure 6:
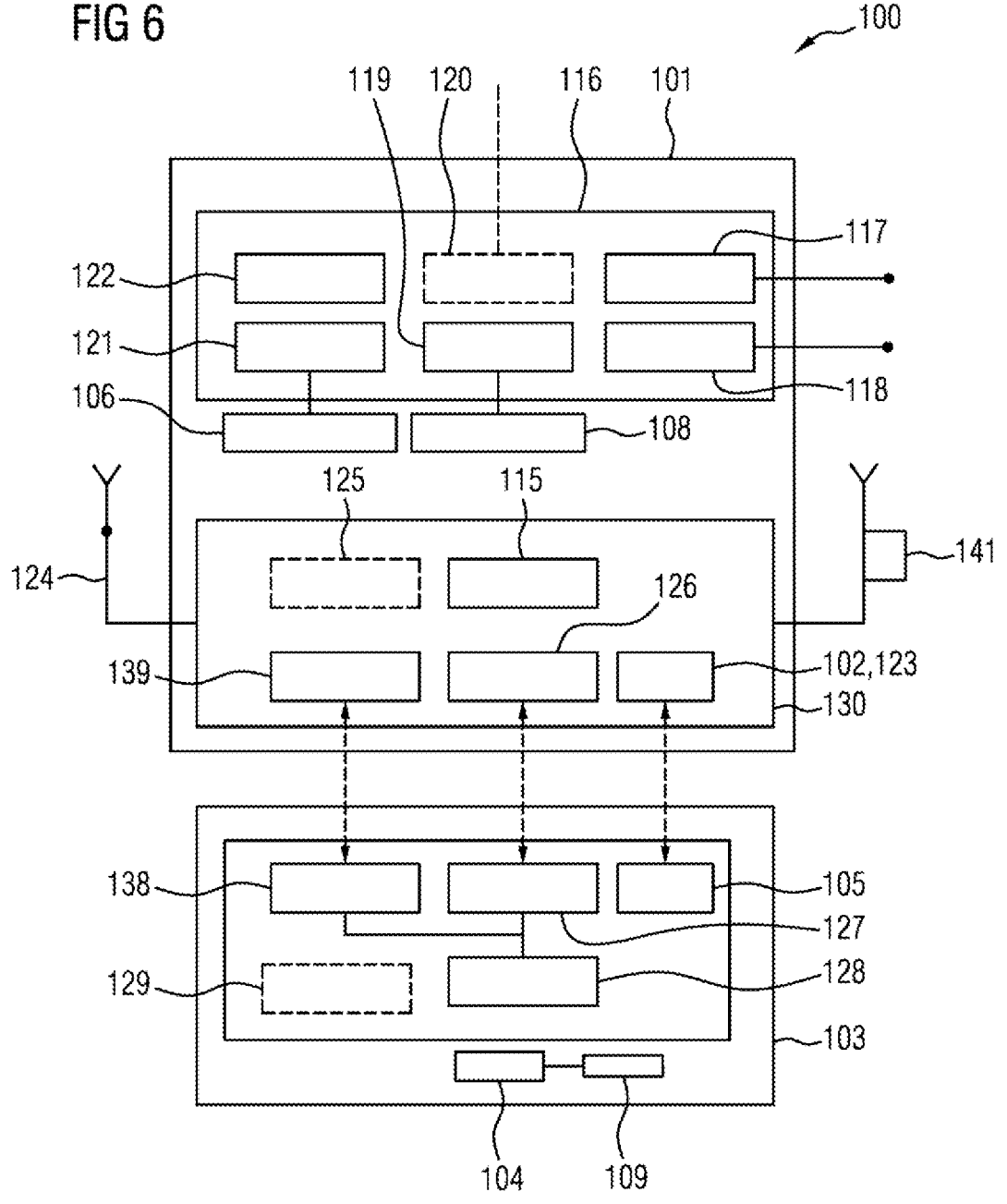
FIG. 6 shows a schematic block diagram of a camera system according to one exemplary embodiment.

The radio transmission of the antenna 127 of the camera 103 is, for example, coupled to the holding device 101 via an antenna coupling 126 (FIG. 6). Appropriate elements are inserted into the side panel 110 for this purpose. These are for example positioned so that they are arranged close to the antenna 127 of the camera 103, in order to ensure good coupling. The antenna coupling is, for example, realized by means of a plurality of individual elements or by a ring. The fastening of the camera 103 in the holding device 101 is in particular realized without locking, groove or web even when antenna elements are already present in the side panel 110.

A compensator is provided according to the exemplary embodiment, in order to balance out the coupling losses and the conduction losses of the feed line to the external antenna 124. An analog amplifier is, for example, used for this purpose both in the transmitting and receiving devices. The RX/TX changeover, for example, takes place here by detecting a transmission process of the camera.

Alternatively or in addition, it is possible to feed the signal received in the holding device 101 to a receiver integrated into the holding device 101 that performs a decoding of the signals. The received data is then processed, or is transmitted via a different communication technology or a different physical layer. The holding device 101, for example, comprises an IEEE802.11 receiver, and then passes the signals of the video camera on via a BroadR-Reach network. Alternatively or in addition, a repeater functionality is implemented in the holding device 101. WLAN packets received in the camera 103 are then also again transmitted onward according to the WLAN standard. The repeater can be a single-channel, a dual channel, with 2.4/5 GHz support and/or with conversion from 2.4 GHz up to 5 GHz, or other functionalities.

Alternatively or in addition, a plurality of WLAN modules can be provided outside the holding device 101 that are, for example, connected to one another by means of USB.

Alternatively or in addition, data transmission is realized by means of an additional short-range antenna 138 of the camera 103 and a corresponding short-range antenna 139 of the holding device 101 (FIG. 6). The antennas 138, 139 have, for example, a directional antenna pattern, and the transmission power is kept very small. The short-range antennas 138, 139 are, for example, selected by an antenna switch when using the WLAN module. The communication between the camera 103 and the holding device 101 would then not take place by means of the antenna 127.

Alternatively, further wireless technologies could also be used for the data transmission between the camera 103 and the holding device 101 for transmitting the video signal, for example Bluetooth, UWB, wireless USB, or others.

FIG. 6 shows a block diagram of the camera system 100 according to one form of embodiment. A large number of elements are shown in FIG. 6. According to some exemplary embodiments, individual components are omitted, and an arbitrary combination of the individual components, as well as the omission of individual components, are possible.

The camera 103 comprises the energy receiving device 109 and the accumulator 104 that is electrically connected to it. The camera 103 comprises the second communication interface 105 in order to be able to receive position data from the holding device 101.

The camera 103 comprises the antenna 127 in order to be able to transmit the video signal wirelessly when in operation. Alternatively or in addition, the short-range antenna 138 and/or a WLAN module 128 are provided for this purpose. In addition, according to some exemplary embodiments, a Bluetooth module 129, which can transmit the video signal to the holding device 101, is optionally provided. The camera 103 thus comprises a plurality of wireless interfaces in order to be able to receive and transmit information and data wirelessly.

The holding device 101 comprises a wireless module 130. The wireless module 130 serves for wireless communication with the camera 103 and with the receiving device 132. The holding device 101 comprises the short-range antenna 139 for communication with the short-range antenna 138 of the camera 103. According to some exemplary embodiments, the holding device 101 optionally comprises a WLAN module 125 for transmitting the video signal in accordance with the IEEE802.11 standard. The holding device comprises the antenna coupling 126 in order to be able to receive waves from the antenna 127 of the camera 103. According to some exemplary embodiments, the holding device 101 comprises the signal amplifier 115 that is, for example, designed as a duplex RF amplifier or compensator. The holding device 101 comprises the first communication interface 102 that comprises, for example, the RFID transponder 123. The position data of the holding device 101 can thereby be saved and transmitted to the camera 101.

The holder 101 comprises, for example, a compensator 122 and a driver 121 for operation of the switchable magnets 106.

The holding device 101 also comprises, according to some exemplary embodiments, a charging circuit 119 that is part of the control module 116. The charging circuit 119 is coupled to the energy transmission device 108 or to the coils, in order to realize inductive charging.

Data interfaces 117 are provided in order to be able to receive and output additional information, for example inputs related to operating states of the motor vehicle and outputs relating to operating states of the camera 103. It is thus, for example, possible to exchange information indicating that a reverse gear has been engaged in the vehicle. The camera 103 is, for example, activated depending on this input signal. A trigger input to activate the camera 103 is, for example, realized by means of the data interfaces 117. A trigger signal to activate the camera 103 comes, for example, from the tractor machine and/or from the trailer. A further interface 120 serves, for example, for coupling signals of the holding device 101 to a bus system. An interface 118 is provided at the holding device 101 in order to be able to connect the holding device 101 to a voltage supply.

The holding device 101 is, for example, connected to an external WLAN module 141 in order to be able to transmit the video signal of the camera 101.

A combination of the different variants and exemplary embodiments, and the omission of individual components, are possible. It is, for example, possible that the variants with inductive charging function are also provided with a communication unit in order to support the external antenna 124 or the external WLAN module 141.

With external inputs and outputs it is in addition possible to operate external sensors and/or actuators. It is, for example, possible to operate ultrasonic transmitters and receivers, transmitters for structured light, proximity sensors or other elements of the assistance system 140. It is thus possible to employ the camera system 100 also for distance measurement and full 3D visual display. This is in particular enabled by the accurate knowledge of the position of the camera 103 relative to the other elements and sensors. The sensors and/or actuators are, for example, connected over cables to the holding device 101, or are integrated directly mechanically into and/or at the housing body 135.

Wireless charging, for example in accordance with the QI standard, NFC communication and antenna coupling are thus all possible in the comparatively small physical space in the holding device 101.

The camera system 100 enables an integration of the mobile camera 103 into a multiple-field-of-view camera system of the assistance system 140. The mobile camera 103, when employed in the holding device 101 on the exterior of the vehicle, is connected to an electrical power supply, and the accumulator 104 can be charged. Mounting at an interior of the vehicle is also possible, for example for monitoring an interior of a trailer. The system costs for the user may be reduced due to the possibility of using the camera 103 at a plurality of vehicles. Thus, the components and the design of the camera system 101 enable theft protection. A sufficient radio connection to the receiving device 132 is also possible when screened or similar by the vehicle.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A camera system for a vehicle, comprising:

a holding device which is fastenable to the vehicle and which includes a first communication interface for wireless communication and a switchable magnet;

a camera including a permanent magnet, an accumulator and a second communication interface for wireless communication, the camera being removably fastened to the holding device via magnetic coupling of the permanent magnet of the camera and the switchable magnet of the holding device;

wherein the second communication interface receives position data from the first communication interface via wireless near-field communication to determine a position of the holding device relative to the vehicle when the permanent magnet of the camera is magnetically coupled with the switchable magnet of the holding device;

wherein the camera further includes an antenna for communication via a radio connection with a receiving unit of an assistance system of the vehicle to send an image from the camera together with the position data to the assistance system; and wherein the holding device further comprises a spring mechanism comprising a plurality of springs arranged opposite to each other at opposing side walls of the holding device, said plurality of springs each exerting a respective compressive force on the camera opposite to a magnetic force of the switchable magnet.

2. The camera system as claimed in claim 1, wherein the holding device further comprises an electromagnet which is magnetic when not energized.

3. The camera system as claimed in claim 1, wherein the holding device further comprises a memory which stores information representing the position of the holding device.

4. The camera system as claimed in claim 3, wherein the information indirectly includes the position as a representative identifier.

5. The camera system as claimed in claim 3, wherein the information directly includes the position in relation to a vehicle coordinate system.

6. The camera system as claimed in one of claim 1, wherein the first and second communication interfaces each form part of an RFID communication system.

7. The camera system as claimed in claim 1, wherein the holding device further comprises an energy transmission device which is electrically couplable to an electrical grid of the vehicle;

wherein the camera further comprises an energy receiving device that is electrically connected to the accumulator; and wherein electrical energy is wirelessly transmittable from the energy transmission device to the energy receiving device to inductively charge the accumulator.

8. The camera system as claimed in claim 1, wherein the holding device further comprises a side panel which laterally surrounds the camera when in a fastened state; and wherein the side panel has a height, and a top side of the side panel is flush with a topside of the camera when in the fastened state.

9. The camera system as claimed in claim 1, wherein the holding device further comprises a signal amplifier for extending a range of a radio video signal of the camera.

10. An assistance system for a vehicle, comprising:

a camera system for the vehicle, said camera system comprising a holding device fastened to the vehicle, the holding device including a first communication interface for wireless communication and a switchable magnet, the camera system further comprising a camera including a permanent magnet, an accumulator and a second communication interface for wireless communication;

at least one further camera; and a monitor;

wherein the camera is removably fastened to the holding device via magnetic coupling of the permanent magnet of the camera and the switchable magnet of the holding device;

wherein the second communication interface receives position data from the first communication interface via wireless near-field communication to determine a position of the holding device relative to the vehicle when the permanent magnet of the camera is magnetically coupled with the switchable magnet of the holding device;

wherein the further camera comprises an antenna for communication via a radio connection with a receiving unit of the assistance system of the vehicle to send an image from the camera together with the position data to the assistance system;

wherein images from the camera and the at least one further camera are displayed in combined form on the monitor; and wherein the holding device further comprises a spring mechanism comprising a plurality of springs arranged opposite to each other at opposing side walls of the holding device, said plurality of springs each exerting a respective compressive force on the camera opposite to a magnetic force of the switchable magnet.

11. The assistance system for the vehicle as claimed in claim 10, wherein the camera system forms part of a mirror replacement system for the vehicle.

* * * * *